United States Patent [19]

Pilcher

[11] 4,261,607
[45] Apr. 14, 1981

[54] TOOL FOR INSTALLING ACCOUSTICAL CEILING PANELS

[75] Inventor: Roger Pilcher, Holt, Mo.

[73] Assignee: Donald L. Zemites, Overland Park, Kans.

[21] Appl. No.: 959,063

[22] Filed: Nov. 9, 1978

[51] Int. Cl.$^3$ ............................................. B25J 1/00
[52] U.S. Cl. .............................................. 294/19 R
[58] Field of Search ............ 294/2, 19 R, 20, 22–24, 294/61; 52/122, 126, DIG. 1

[56] References Cited

U.S. PATENT DOCUMENTS

| | | | |
|---|---|---|---|
| 179,718 | 7/1876 | Miller | 294/24 X |
| 817,741 | 4/1906 | Armstrong | 294/19 R |
| 895,366 | 8/1908 | Gunnison | 294/22 |
| 1,339,444 | 5/1920 | Ferguson | 294/24 |
| 2,602,634 | 7/1952 | Read | 294/19 R X |
| 3,090,984 | 5/1963 | Dunnigan | 294/19 R X |
| 4,019,769 | 4/1977 | Filion | 294/19 R |

*Primary Examiner*—Johnny D. Cherry
*Attorney, Agent, or Firm*—Lowe, Kokjer, Kircher, Wharton & Bowman

[57] ABSTRACT

The subject tool is used in the installation and removal of accoustical panels from the support grid of a suspended ceiling. The tool includes a handle having a support structure adjustably secured to it. A plurality of needle-like projections are mounted to the support structure so as to protrude outward therefrom at a right angle therewith. In use, an accoustical panel is releasably secured to the support structure. Thereafter, the tool is raised and manipulated until the panel is in place within the support grid. The tool is then lowered causing the needle-like projections to slide out of contact with the accoustical panel thereby mounting the panel in place within the support grid.

5 Claims, 6 Drawing Figures

TOOL FOR INSTALLING ACCOUSTICAL CEILING PANELS

BACKGROUND AND BRIEF DESCRIPTION OF THE INVENTION

This invention relates in general to a tool for installing accoustical panels in and for removing accoustical panels from the support grid of a suspended ceiling.

A suspended ceiling is typically comprised of a support grid which is constructed of a plurality of T-shaped support members. The T-shaped support members are normally arranged in a criss-crossing manner to form a generally rectangular grid pattern. Rectangular accoustical panels are then mounted into place within the rectangular areas formed by the support members. These accoustical panels are typically constructed out of a fibrous material such as mineral fiber or fibrous glass to thereby provide a perforable material.

Presently, these accoustical panels are mounted within and removed from the support grid by hand. This technique, however, is extremely limited and highly unsatisfactory since a workman must use a ladder or scaffolding to install accoustical panels in or to remove accoustical panels from a ceiling that is above his normal reach.

If a workman is using a ladder to install panels, he must get off the ladder each time he installs a panel so that the ladder can be moved to the next area in which a panel is to be mounted. In addition, a ladder does not provide sufficient space for storing panels within the reach of the workman when he is in position on the ladder. As a result, the workman must either carry a panel with him as he climbs up the ladder or have another workman hand him a panel once he is positioned on the ladder. Both of these procedures are highly undesirable because they increase the risk of accident. In addition, the aid of a second workman increases installation costs.

Use of a scaffolding is likewise undesirable because scaffolding is time consuming to assemble and costly to use. In addition, the scaffolding must be moved each time a panel or section of panels are installed. Relocation of the scaffolding requires the workman installing the panels to climb down from the scaffolding to move it to the new position and to then return to the platform for installation of the next series of panels. This course of conduct is undesirable because it is inconvenient and time consuming. Another method for moving the scaffolding consists of having additional workmen on the ground move the scaffolding to a new position once a panel or section of panels have been installed. This technique, however, is also undesirable because the additional workmen needed to move the scaffolding increase the cost of installing the ceiling panels.

It is therefore an object of the present invention to provide a tool for installing and removing accoustical panels from the support grid of a suspended ceiling whereby a workman using the tool can install or remove panels from a high ceiling without the use of a ladder or scaffolding.

Another object of the present invention is to provide a tool for installing or removing accoustical panels from the support grid of a suspended ceiling whereby a workman can use the tool from the floor to thereby make the installation process more efficient and less time consuming.

A further object of the present invention is to provide a tool of the character described which facilitates the installation or removal of ceiling panels from areas above obstacles where a ladder or scaffolding cannot be positioned.

It is a further object of the present invention to provide a tool of the character described which is simple and economical to construct, which may be quickly and easily used, and which is adapted for use with ceilings located at various heights.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views.

Figure 4:
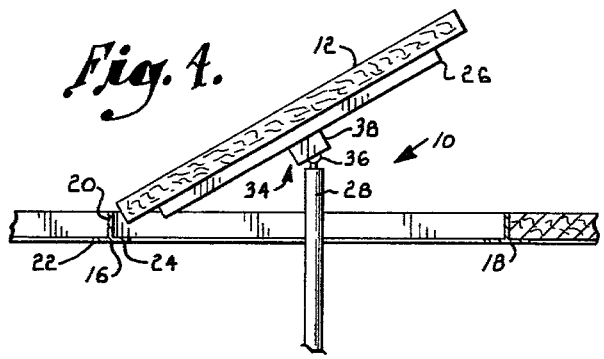
FIG. 4 is a side elevational view showing the first embodiment of the tool of the present invention being used to install an accoustical panel into the support grid of a suspended ceiling.

Referring now to FIGS. 1–4, the numeral 10 is used to generally designate a first embodiment of a tool which may be used to install or remove an accoustical panel 12 from the support grid of a suspended ceiling. The support grid is comprised of a plurality of T-shaped support members such as 16 and 18 which are arranged in a criss-cross manner to form a generally rectangular grid pattern. Support member 16 is representative of each support member used in the support grid, and, as shown in FIG. 4, is comprised of a center post 20 and a pair of lateral support plates 22 and 24 which extend outward on opposite sides of the centerpost at a right angle therewith. The center post of each support members is appropriately secured to the ceiling in spaced apart relationship therewith. Adjacent support members such as 16 and 18 are positioned so that the distance between their center posts is just slightly greater than the corresponding dimension of a panel. In this way, the ceiling panels are capable of lying flat and are supported by the portion of the panel which contacts the lateral support plate.

Figure 1:
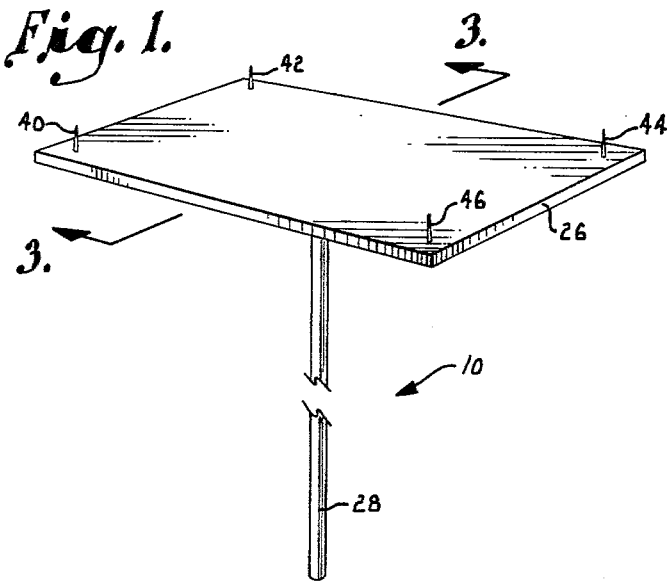
FIG. 1 is a perspective view showing a first embodiment of a tool constructed according to the present invention.
Figure 2:
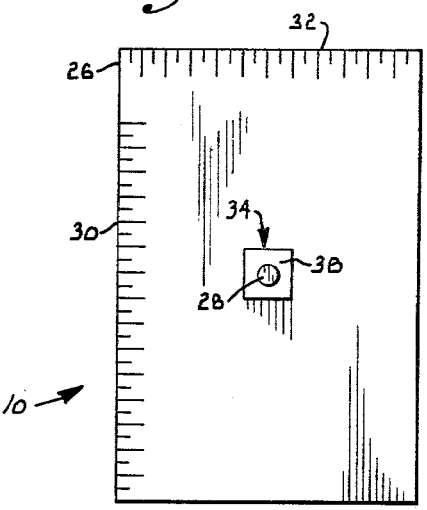
FIG. 2 is a bottom plan view of the first embodiment of the tool of the present invention.
Figure 3:
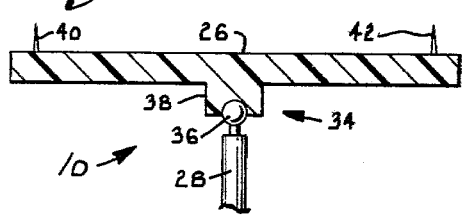
FIG. 3 is a cross sectional view taken along line 3—3 of FIG. 1.

Tool 10 is comprised of a support structure 26 for holding an accoustical panel in a suitable manner and an elongate handle 28. The support structure used in this embodiment of the invention is generally rectangular and, as shown in FIG. 4, is somewhat smaller than the accoustical panels to be installed. In particular, the dimensions of the support structure must be less than the distance between the ends of adjacent support plates so that the support structure of the tool is capable of free movement within the rectangular area formed by the support members to allow for easy installation of the panels. The support structure is constructed of a rigid material such as wood, plastic, aluminum or any other lightweight metal. In addition, the underside of the support structure is ruled as shown in FIG. 2 at 30 and 32.

The elongate handle 28 is likewise constructed of a sturdy, lightweight material such as wood, plastic, aluminum or some other lightweight metal. The handle may be rigidly fixed to the underside of the support structure so that it forms a right angle therewith. It is preferable, however, to moveably couple the handle to the underside of the support structure to be able to adjust the angle therebetween. This type of coupling provides added flexibility which makes the tool suitable for use in areas that are inaccessible by a ladder or scaffolding and for use with respect to a support grid which is not parallel to the floor.

While this moveable coupling may be constructed numerous ways which are well known to those of ordinary skill in the art, the coupling shown in these figures is comprised of a ball and socket coupling arrangement which is generally designated by the numeral 34. The ball and socket coupling is comprised of a spherical knob 36 which is fixedly secured to handle 28 and a socket which is located within a housing 38 that is fixedly secured to the underside of the support structure.

A plurality of needle-like projections or sharp tipped pins 40, 42, 44 and 46 are provided to releasably secure a panel to the upper surface of the support structure. These needles are rigidly secured to the support structure and protrude outward from the upper surface of the support structure at a right angle therewith.

In use, an accoustical panel is initially positioned with respect to the support structure 26 so that the surface of the panel to be exposed after installation is in contact with the upper surface of the structure. This panel is then releasably secured to the support structure by forcing needles 40, 42, 44 and 46 into the body of the panel through the surface of the panel facing the upper surface of the support structure.

Once the accoustical panel is mounted onto the support structure in this manner, the tool is raised by the handle and manipulated until the accoustical panel and support structure of the tool are above the lateral support plates of the T-shaped support members which form the rectangular area in which the panel is to be installed. Thereafter, the tool is lowered to bring the exposed surface of the panel into contact with the lateral support plates of the T-shaped support members that form the rectangular area in which the panel is to be installed. The lateral support plates of these support members support the installed panel and impede the further downward movement thereof. Thereafter, continuous lowering of the tool causes the needles to slide out of contact with the panel leaving the panel in position within the rectangular area of the grid network.

This tool can also be used to remove ceiling panels from the support grid of a suspended ceiling. In this manner of use, the tool is raised by means of the handle until its support structure is in close proximity with the ceiling panel to be removed. Thereafter, the panel is releasably secured to the support structure of the tool by sharply raising the tool so that the needles which project outward from the upper surface of the support structure are forced into the body of the panel through the exposed surface thereof. Once the panel is properly mounted onto the support structure of the tool in this manner, the tool is manipulated until the panel is removed from the rectangular area of the support grid in which it was mounted. The tool is then lowered and the panel is removed from the support structure by moving the panel away from the support structure so that the needles slide out of contact with the panel.

It should be noted that the moveable coupling between the handle and support structure permits the tool to be used to install and remove ceiling panels from above obstacles which are inaccessible by ladders and scaffolds. As a result, this tool may be used from a position directly below the area where the panel is to be installed or removed or from a position offset therefrom. This feature of the present invention also makes it suitable to install or remove panels from a support grid which is not parallel to the floor. To use the tool from an offset position, the support structure 26 and handle 28 are moved so that the angle between the support structure and handle makes it convenient to use the tool from the offset location. In other words, the angle formed by the handle and support structure should be such that the handle is in a convenient position with respect to the workman using the tool while the support structure is parallel to the ground or floor.

Handle 28 provides a convenient grip for manipulation of the tool. In addition, its length can be varied and the handle can be held at various locations to accommodate ceilings of differing heights.

The ruled 30 and 32 underside of the support structure allows the tool to be used to measure various items or obstructions on the ceiling such as heating or cooling vents. To use the tool in this manner, the angle between the handle 28 and the support structure is initially set so that the underside of the support structure is generally coplanar with the item or obstruction to be measured when the support structure is brought into close proximity therewith. Thereafter, the underside of the support structure is brought near the item or obstruction to be measured and the size of the item or obstruction determined by comparing the dimensions thereof with the ruled markings on the underside of the support structure.

Figure 5:
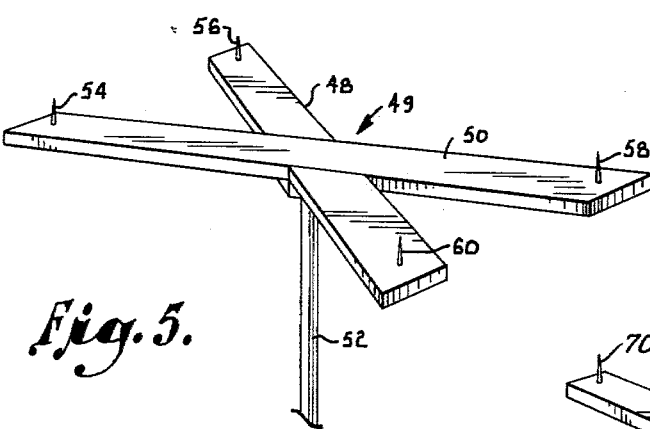
FIG. 5 is a perspective view of a second embodiment of a tool constructed according to the present invention.

Reference is now made to FIG. 5 wherein a second embodiment of the tool is shown. In this embodiment of the tool, the support structure 49 is changed from the generally rectangular shape shown in FIGS. 1-4 to a pair of cross pieces 48 and 50 which intersect with each other to form an X. The tool shown in this figure also includes a handle 52 which is coupled with the underside of the support structure as described above with respect to FIGS. 1-4 and a plurality of needles 54, 56, 58 and 60 which are mounted onto the support structure as described above with respect to FIGS. 1-4. The tool shown in FIG. 5 is used to install the accoustical panels in the same manner as the tool shown in FIGS. 1-4.

Figure 6:
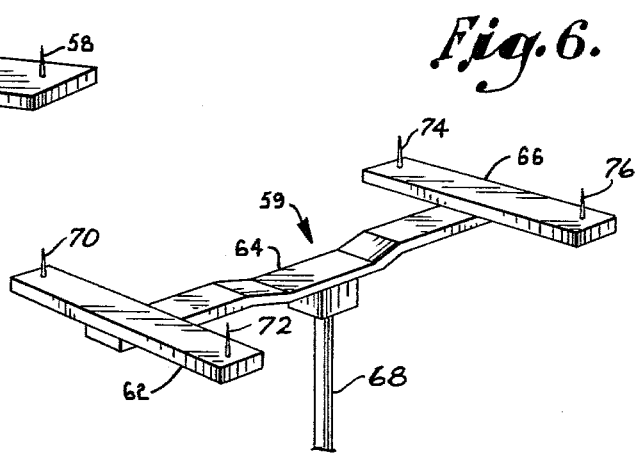
FIG. 6 is a perspective view of a third embodiment of a tool constructed according to the present invention.

A third embodiment of this tool is shown in FIG. 6. The tool shown in this FIG. is the same as the one shown in FIGS. 1-4 with the exception that the support structure 59 used in this embodiment of the tool is comprised of a plurality of support pieces 62, 64 and 66 which are interconnected to form an H. The tool shown in this FIG. also comprises a handle 68 and a plurality of needles 70, 72, 74 and 76. The handle and needles are secured to the support structure as described above with respect to FIGS. 1-4. The tool shown in FIG. 6 is used in the same manner as the tool shown in FIGS. 1-4.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A tool for installing an accoustical panel into and for removing an accoustical panel from the support grid of a suspended ceiling, said tool comprising:
   an elongate handle;
   a support structure having an upper surface and a lower surface, said support structure being arranged to support an accoustical panel on the upper surface thereof in a stable manner;
   said support structure being comprised of a first support piece and a second support support piece, said first and second support pieces being coupled so as to generally form an X;
   means for releasably securing said accoustical panel to the upper surface of said support structure without disfiguring said accoustical panel after said panel is located within said suspended ceiling; and
   means for coupling said elongate handle with said support structure.

2. A tool for installing an accoustical panel into and for removing an accoustical panel from the support grid of a suspended ceiling, said tool comprising:
   an elongate handle;
   a support structure having an upper surface and a lower surface, said support structure being arranged to support an accoustical panel on the upper surface thereof in a stable manner;
   said support structure being comprised of a first support piece, a second support piece and a third support piece, said first support piece being coupled with said second support piece and with said third support piece to generally form an H;
   means for releasably securing said accoustical panel to the upper surface of said support structure without disfiguring said accoustical panel after said panel is located within said suspended ceiling; and
   means for coupling said elongate handle with said support structure.

3. A tool for installing an accoustical panel into and for removing an accoustical panel from the support grid of a suspended ceiling, said tool comprising:
   an elongate handle;
   a support structure having an upper surface and a lower surface, said support structure being arranged to support an accoustical panel on the upper surface thereof in a stable manner;
   said lower surface of said support structure being ruled;
   means for releasably securing said accoustical panel to the upper surface of said support structure without disfiguring said accoustical panel after said panel is located within said suspended ceiling; and
   means for coupling said elongate handle with said support structure.

4. A method for installing accoustical panels into the support grid of a suspended ceiling by means of a tool having an elongate handle coupled with a support structure having an upper and a lower surface, said lower surface having a ruled portion thereof, said method comprising the steps of
   measuring a ceiling obstruction by comparing the dimensions of said obstruction with the lower surface of said support structure,
   releasably securing an accoustical panel to said support structure so that the surface of said panel which is to be exposed after installation of said panel is in contact with the upper surface of said support structure,
   raising said tool by means of its elongate handle to bring said support structure in close proximity with said support grid,
   manipulating said tool to properly position said panel with respect to said support grid, and
   lowering said tool to install said panel in place within said support grid and to release said panel from said support structure without disfiguring said panel.

5. A method for installing accoustical panels into the support grid of a suspended ceiling by means of a tool having an elongate handle adjustably coupled with a support structure having an upper and a lower surface, said lower surface being ruled, said method comprising the steps of
   measuring a ceiling obstruction by comparing the dimensions of said obstruction with the ruled lower surface of said support structure,
   releasably securing an accoustical panel to said support structure so that the surface of said panel which is to be exposed after installation of said panel is in contact with the upper surface of said support structure,
   adjusting said handle with respect to said support grid so that said support structure is generally coplanar with the plane formed by said support grid when said support structure is brought in close proximity with said support grid,
   raising said tool by means of its elongate handle to bring said support structure in close proximity with said support grid,
   manipulating said tool to properly position said panel with respect to said support grid, and
   lowering said tool to install said panel in place within said support grid and to release said panel from said support structure without disfiguring said panel.

* * * * *